Patented Apr. 28, 1942

2,281,526

UNITED STATES PATENT OFFICE 2,281,526

GRINDING WHEEL

Lowell H. Milligan and Robert H. Lombard, Worcester, Mass., assignors to Norton Company, Worcester, Mass., a corporation of Massachusetts No Drawing. Application May 16, 1940,
Serial No. 335,502

1 Claim. (Cl. 51—308)

The invention relates to boron carbide abrasive bodies and with regard to its more specific features to grinding wheels in which the abrasive is boron carbide and the bond is a ceramic bond. This application is a continuation in part of our copending application Serial No. 51,334 filed November 23, 1935.

One object of the invention is to provide a method of bonding boron carbide particles with a ceramic bond. Another object of the invention is to avoid or inhibit oxidation of boron carbide particles in a mixture thereof with ceramic material while the ceramic material is being vitrified. Another object of the invention is to provide a suitable ceramic material for bonding boron carbide particles. Another object of the invention is to provide a method of making a grinding wheel or similar abrasive article of boron carbide and a ceramic bond which is thoroughly practical in actual commercial use. Another object of the invention is to provide the best practical atmosphere for the vitrification of a ceramic-boron carbide article. Another object of the invention is to bond boron carbide with a ceramic bond thoroughly wetting the individual particles. Another object of the invention is to provide a grinding wheel composed of boron carbide abrasive particles and a vitrified ceramic bond. Another object of the invention is to provide a method for the manufacture of such articles avoiding swelling during firing. Another object of the invention is to provide a grinding wheel for the grinding of cemented carbides for example in the manufacture, sharpening and resharpening of cutting tools for machine tools. Other objects will be in part obvious or in part pointed out hereinafter.

The invention accordingly consists in the features of construction, combinations of elements, arrangements of parts, and in the several steps and relation or order of each of said steps to one or more of the others thereof, all as will be illustratively described herein, and the scope of the application of which will be indicated in the following claim.

We provide a quantity of boron carbide particles. Preferably this is boron carbide of approximately the formula $B_4C$ as developed by R. R. Ridgway and disclosed for example in United States Letters Patent No. 1,897,214. However we do not exclude the use of a boron rich boron carbide, especially since we have found the presence of free graphite on boron carbide particles is objectionable.

We may use any grain size of boron carbide particles. In so much as we contemplate that grinding wheels according to our invention shall be used to a considerable extent for producing a smooth surface on such hard articles as cemented carbides we will usually provide a medium or fine grain, for example of the order of 60 or 100 mesh grit size.

We provide ceramic materials for forming a vitrified bond. Within the limits of the invention we may use many different ceramic mixes for the bond. We prefer to use a ceramic material which shall effectively wet the boron carbide granules. One of the characteristics of boron carbide is that it is rather difficult to wet. Many softened ceramics will not wet the boron carbide granules to give the desired result in adhesiveness in the ultimate bond when hardened. Furthermore we desire to employ a ceramic which is adhesive with respect to boron carbide granules, so far as this may require qualities other than wetability.

We also find that it is important in most cases thoroughly to clean the boron carbide particles before incorporation into the mix. We have observed that boron carbide grains are usually contaminated with a surface coating of free graphite or graphitic material. This coating will interfere with the proper wetting of the boron carbide and in fact will prevent proper adhesion of the glassy bond to the boron carbide particles. We therefore remove the coating of graphite or graphitic material in any suitable manner. One satisfactory method of so doing is to wash the boron carbide abrasive with water and we may use any suitable detergent such as soap, sodium silicate, or the like. For example we may pass water into and out of a rotatable drum through hollow trunnions. The boron carbide abrasive particles can be placed in this hollow drum and after a short period will be thoroughly washed as the graphite will float off.

Boron carbide is a hard material and in order that efficient results shall be obtained from the use thereof a hard and strong bond is desirable. Organic bonds such as shellac and phenol formaldehyde also the alkaline silicate bonds are deemed to be too soft and to lack the requisite strength to hold the boron carbide during the entire useful life thereof. We therefore obtain optimum results through the use of a well vitrified ceramic bond and prefer a ceramic mix which in the ultimate bond is strong and tough. We prefer to use a ceramic which is non-reactive toward boron carbide chemically even at high temperatures.

Boron carbide can be oxidized not only by oxygen from the atmosphere but also by certain bonding ingredients of certain ceramic mixes. Therefore we avoid the use of such clays or the like as contain substantial quantities of iron oxides which might oxidize the boron carbide. In view of the fact that it is difficult to eliminate all oxygen from the pores of the article we also avoid the use of an excess quantity of alkaline fluxes such as soda. We desire, as aforesaid, a strong ceramic bond on the acid side and therefore desire to use a mix which is high in silica. But since silica is a very refractory material in the ceramic art we include a large quantity of an ingredient which will reduce the softening temperature for good bonding. Such a material, and the best one known to us, is boric oxide ($B_2O_3$).

Considering now an illustrative example, we take thirty parts of ball clay and seventy-five parts of a frit according to the following formula, all parts being by weight for convenience:

|  | Parts |
|---|---|
| Borax | 32.2 |
| Boric acid | 25.4 |
| Silica | 37.6 |
| Hydrate of alumina | 1.0 |
| Whiting | 3.8 |

This frit may be produced in any manner usual for the production of frits. The frit in liquid phase may be quenched in water and thereafter the resulting fragments may be ground. The calculated chemical composition of this frit is as follows:

|  | Per cent |
|---|---|
| $Na_2O$ | 7.3 |
| $CaO$ | 3 |
| $Al_2O_3$ | .9 |
| $B_2O_3$ | 36.4 |
| $SiO_2$ | 52.4 |

Instead of the foregoing we may use the following:

|  | Parts |
|---|---|
| Kentucky ball clay | 15 |
| Ground flint | 15.5 |
| Borax | 19.5 |

For this mixture we might increase the amount of ball clay up to 20; we might increase the amount of flint to 20 and we might reduce the borax to 12 parts. The mixture aforesaid is alumino-boro-silicate glass when fused. So also is the ceramic of the example first given. One of the characteristics of these ceramics is the property of softening sufficiently for good bonding at a comparatively low temperature. For example the ceramic of the example as given will soften sufficiently for good bonding at 925° C. The ceramic of the second example as given will soften sufficiently for good bonding at in the neighborhood of 1000° C. Variations of these bonds soften at different temperatures sufficiently, but where the amount of boric oxide and soda is maintained at about the proportions hereinbefore specified, the softening temperatures are generally of the order of 1000° C. and below. It will be noted that there is some soda in each of the above examples but this is more than balanced by the boric oxide used so that the net reaction is still on the acid side.

Continuing now with the preferred example of the invention, we take four parts, by weight, of washed boron carbide of 100 mesh grit size and one part by weight of any of the above ceramic mixes. We mix these ingredients sufficiently so as to coat each boron carbide granule with ceramic bond. Preferably we first wet the boron carbide grains with water then sift in the dry bond while stirring the grains to effect a thorough mixing. After having thereby produced a satisfactory mix of the type generally referred to in the art as a "dry granular mix" we place a quantity thereof in a mold of the desired character and press to the desired shape. Pressure of the order of six thousand pounds to the square inch may be employed for small articles and for larger articles or wheels a lesser pressure is satisfactory.

In some cases we may use a temporary binder to add green strength. Instead of using water to wet the abrasive grains we may use a solution of sodium silicate. For example we may provide a quantity of sodium silicate equal to one per cent of the entire mix, diluting it with water in the proportion of three parts of water to one part of sodium silicate. This solution is used to coat the boron carbide granules before the powdered ceramic bond is added. We may also use organic temporary binders such as methyl ether of cellulose of the type sold under the trade-mark "Glutoline." We achieve good results using a 4 per cent solution of "Glutoline" the quantity thereof being four per cent by weight of the entire mixture.

In cases where organic temporary binders are used we avoid burning them out at a temperature which might cause oxidation of the boron carbide. In general we prefer, therefore, to carry out the entire heating cycle in a non-oxidizing atmosphere although we may burn out the organic temporary binder, if such be used, at a low temperature, for example of the order of below 500° C. When the organic temporary binder is not burned out it will nevertheless largely disappear in the firing operation by dry distillation, passing off as gases, and methyl ether of cellulose yields a very insignificant solid residue. We want to avoid the presence of any substantial amount of free carbon in the mix during the firing since such may interfere with the proper wetting of the boron carbide granules.

Considering now more particularly the method of vitrifying the bond, we provide a closed furnace of any desired form. We prefer a comparatively impervious or non-porous furnace which can be opened for the introduction and removal of the articles to be heat treated and having suitable connections for the introduction of the desired gases into the furnace and the control thereof. For instance, it is desirable to have an inlet valve and an exhaust valve wherein a slight flow of gas into the furnace may be maintained during the firing in order to keep the atmosphere at the desired concentration in a particular case despite possible leakage or other source of contamination. We provide any type of kiln furniture. This may take the form of bonded alumina refractory plates which will not soften under the temperatures employed in the furnace. Other kiln furniture such as nichrome plates might be employed.

Placing one or a number of the pressed "green" wheels or other abrasive articles on the plate or plates, we introduce it or them into the furnace. We then close the furnace.

We provide a source of hydrogen and purify it by passing it over hot copper to remove all traces of oxygen or other oxidizing gases. We also pass it through sulfuric acid to remove any moisture. We connect this source of hydrogen to the inlet valve and run the hydrogen into the furnace for a while to exhaust all the air. We then raise the temperature gradually to 925° C. more or less. A satisfactory heat cycle is three hours to 950° C., four hours at 950° C., then allow the furnace to cool as rapidly as it will to room temperature. We prefer to keep up the flow of hydrogen until the temperature has dropped at least below 400° C.

We have found that hydrogen is the best gas to use so far as all practical considerations are concerned. In the first place it is readily available and reasonably cheap. In the second place it is not only non-oxidizing, it is actually reducing. Any residual oxygen left in the pores of the article will preferentially combine with the hydrogen thus not attacking the boron carbide. However, other non-oxidizing gases may be used if care is taken to exclude all free oxygen and the gas should be dry. As examples of other gases we mention nitrogen and carbon monoxide.

As a result of the foregoing there is formed a ceramic bonded grinding wheel having the characteristics, or some of them, hereinbefore set forth. The grade hardness of the article is or may be very high.

According to our invention the ceramic bond has the following calculated as oxides:

| | Per cent |
|---|---|
| $SiO_2$ | 45–65 |
| $B_2O_3$ | 15–40 |
| $Al_2O_3$ | 3–20 |
| Oxide of alkali metal | 3–10 |

It will thus be seen that there has been provided by this invention a method and an article in which the various objects hereinbefore set forth together with many thoroughly practical advantages are successfully achieved. As various possible embodiments might be made of the mechanical features of the above invention and as the art herein described might be varied in various parts, all without departing from the scope of the invention, it is to be understood that all matter hereinabove set forth is to be interpreted as illustrative and not in a limiting sense.

We claim:

A grinding wheel or other abrasive article comprising boron carbide abrasive particles bonded with a ceramic bond having the following formula, 45% to 65% by weight of $SiO_2$, 15% to 40% of $B_2O_3$, 3% to 20% of $Al_2O_3$, and 3% to 10% of an oxide of alkali metal.

LOWELL H. MILLIGAN.
ROBERT H. LOMBARD.